United States Patent [19]

Sprung

[11] Patent Number: 4,800,674

[45] Date of Patent: Jan. 31, 1989

[54] GREENHOUSE STRUCTURE

[76] Inventor: Philip D. Sprung, c/o 1001 - 10th Ave., SW., Calgary, Alberta, Canada, T2R 0B7

[21] Appl. No.: 947,638

[22] Filed: Dec. 30, 1986

[51] Int. Cl.$^4$ ............................................. A01G 9/14
[52] U.S. Cl. ........................................... 47/17; 47/59
[58] Field of Search .................... 47/17, 18, 48.5, 79, 47/59, 62

[56] References Cited

U.S. PATENT DOCUMENTS

| | | | |
|---|---|---|---|
| 3,080,875 | 3/1963 | Bartlett | 47/17 |
| 4,118,891 | 10/1978 | Kehl et al. | 47/62 |
| 4,141,798 | 2/1979 | Groose | 47/17 |
| 4,149,970 | 4/1979 | Atkins et al. | 47/62 |
| 4,352,256 | 10/1982 | Kranz | 47/17 |
| 4,430,828 | 2/1984 | Oglevee et al. | 47/17 |

FOREIGN PATENT DOCUMENTS

| | | | |
|---|---|---|---|
| 2728412 | 1/1979 | Fed. Rep. of Germany | 47/17 |
| 2229346 | 1/1975 | France | 47/17 |
| 2446591 | 9/1980 | France | 47/17 |

Primary Examiner—Robert A. Hafer
Assistant Examiner—Samuel Rimell
Attorney, Agent, or Firm—Kenyon & Kenyon

[57] ABSTRACT

A greenhouse structure for growing plants using nutrient feed solution. The structure comprises a plurality of elongated greenhouse production areas. Each area has a shell and a base enclosing a predetermined space within which plants are grown. The areas radially extend outwardly from a central supply area in which nutrient feed solution is supplied to the production areas is kept. The base of each of the production areas are sloped upwardly in the direction away from the central supply area so that excess nutrient feed solution passing to the production areas will return by gravity flow to the central supply area. The structure further provides pump and conduit means to supply nutrient feed solution from the central supply area to the production areas. The conduit means are sloped to return by gravity flow excess nutrient from the production areas to the central supply area. The structure according to the present invention provides for easy maintenance increased hygiene (through drainage of any non-processed water from the production zone on a continuous basis) and increased security (through collection of any nutrient solution or water in the system if required and quick detection and repair of any leaks).

11 Claims, 5 Drawing Sheets

GREENHOUSE STRUCTURE

This invention relates to an improved greenhouse structure for growing plants using nutrient film technology.

BACKGROUND OF THE INVENTION

Traditional greenhouse structures, consisting of transparent panes of glass forming a roof to enclose a growing area, drawing air from the outside and having a heater for winter months, while adequate for many purposes, possess many shortcomings which make them unsuitable for year-round production of many types of fruits and vegetables in certain climatic conditions, e.g. in far Northern or far Southern climates where temperature and light conditions may be poor. In addition, because such greenhouses often are not well sealed against the outside environment, unsuitable temperature differentials may be created within. As well, outside air which may contain substances which are not conductive to proper growth of plants, is permitted to enter. Also, by-products from the heater system, which often is a natural gas or oil furnace, may be present in the environment within such greenhouses again causing reduced plant growth. The water which is used in such greenhouses is often local water and again may contain impurities or compositions which impede plant growth. There is an increasing awareness of the detrimental impact of impurities in the air or water on plant growth. In addition, the concentration of elements required for plant growth such as calcium, nitrogen and phosphorous in water being fed to plants in conventional greenhouses may change from day-to-day, resulting in irregular plant growth.

As a result, in recent years there has been a trend towards development of controlled environment horticultural or agricultural installations. For example, Canadian Pat. No. 1,097,075 of Miller issued Mar. 10, 1981 describes and illustrates a nutrient supply system for such a controlled environment agricultural installation incorporating nutrient film techniques in which plant root masses are arranged to be wetted by contact with a small stream of liquid nutrient solution. Capillary attraction or wicking then is relied upon to extend the nutrient-wetted area over and through the entire root mass. Nutrient supply is achieved by positioning the plant roots in long troughs and flowing a thin stream of liquid nutrient solution along the bottom of the trough permitting the stream to contact each of the plant root masses as it flows along. Excess nutrient is recycled usually after any needed replenishment of its compositional elements.

Such attempts in a greenhouse to control the various conditions responsible for plant growth have, heretofore been extremely limited in scope. Thus, for example, in Miller Canadian Pat. No. 1,097,075, only the nutrient feed is controlled. In Canadian Pat. No. 982,426 of Delano et al issued Jan. 27, 1976, a method of controlling the amount of solar heat and light which enters a glass or plastic greenhouse is described wherein a liquid is coated on the glass or plastic film of the greenhouse. The liquid dries into a coating which is transparent under certain conditions and non-transparent under other conditions. In Canadian Pat. No. 955,748 of Glatti et al issued Oct. 8, 1984, the light passing through a translucent covering of a greenhouse is partially controlled by coating the inner surface of the translucent covering with a surface-active agent, which surface-active agent reduces the contact angle of water-condensate droplets formed on the inner surface thereof to below 75°.

Other patents of general background interest describing different types of greenhouse structures include U.S. Pat. No. 4,195,441 of Baldwin issued Apr. 1, 1980 (solar greenhouse in which plants are used as solar collectors to absorb solar radiation and store it in a heat reservoir beneath the greenhouse) and U.S. Pat. No. 4,352,256 of Kranz issued Oct. 5, 1982 (greenhouse structure including a central hub and arms comprising growth chambers extending radially outwardly therefrom).

While previous attempts to provide controlled environment horticultural installations have apparently been successful for the limited purposes for which they were developed, attempts to provide a comprehensive controlled environment horticultural installation and method in which all or most of the environmental factors required for proper plant husbandry are controlled has not as yet been developed. In my co-pending application Ser. No. 947,636 there is described and illustrated a controlled environment horticultural installation in which a comprehensive controlled environment providing most of the factors required for proper plant husbandry. It is an object of the present invention to provide a structural layout which complements that invention and facilitates the delivery and handling of nutrient feed solution to the plants. It is a further object of the present invention to provide a greenhouse structure of the general type in question to facilitate drainage of water from plant production areas on a continuous basis and provide for increased security of a system including collection of excess nutrient and quick detection and repair of any leaks in the nutrient delivery system.

SUMMARY OF THE INVENTION

According to the present invention there is provided, in a greenhouse structure for growing plants using nutrient feed solution, a plurality of elongated greenhouse production areas, each having a shell and a base enclosing a predetermined space within which plants are to be grown. The production area radially extends outwardly from a central supply area in which nutrient feed solution to be supplied to the production areas is to be kept. The base of each of the production areas is sloped upwardly in the direction away from the central supply area so that excess nutrient feed solution passed to the production areas will return by gravity flow to the central supply area. pump and conduit means supply nutrient feed solution from the central supply area to the production areas and sloped conduit means return by gravity flow excess nutrient from the production areas to the central supply area.

In a preferred embodiment of the present invention each of the production area bases is sloped downwardly away from the center in the transverse direction. In another preferred embodiment elongated corridors extend beneath the base of each production area, and the conduit means to supply nutrient feed solution to each production area pass through the corresponding corridor below that production area.

The structure according to the present invention allows the excess nutrient solution delivered to a production area to be recollected on a continuous basis, without the use of any pumping system for return. In the event that a reservoir in the central supply area has to be discharged, either for normal replenishment or for disease considerations, all of the nutrient solution in the system can be readily collected. By placing the conduit means for supplying the nutrient feed solution to each of the production areas in a corridor below the base of each production area, any leakage in a break in a supply conduit may be quickly detected and repaired.

BRIEF DESCRIPTION OF THE DRAWINGS

These and other objects and advantages of the invention will become apparent upon reading the following detailed description and upon referring to the drawings in which.

While the invention will be described in conjunction with an example embodiment, it will be understood that it is not intended to limit the invention to such embodiment. On the contrary, it is intended to cover all alternatives, modifications and equivalents as ma be included within the spirit and scope of the invention as defined by the appended claims.

DETAILED DESCRIPTION OF THE INVENTION

In the drawings similar features have been given similar reference numerals.

Figure 1:
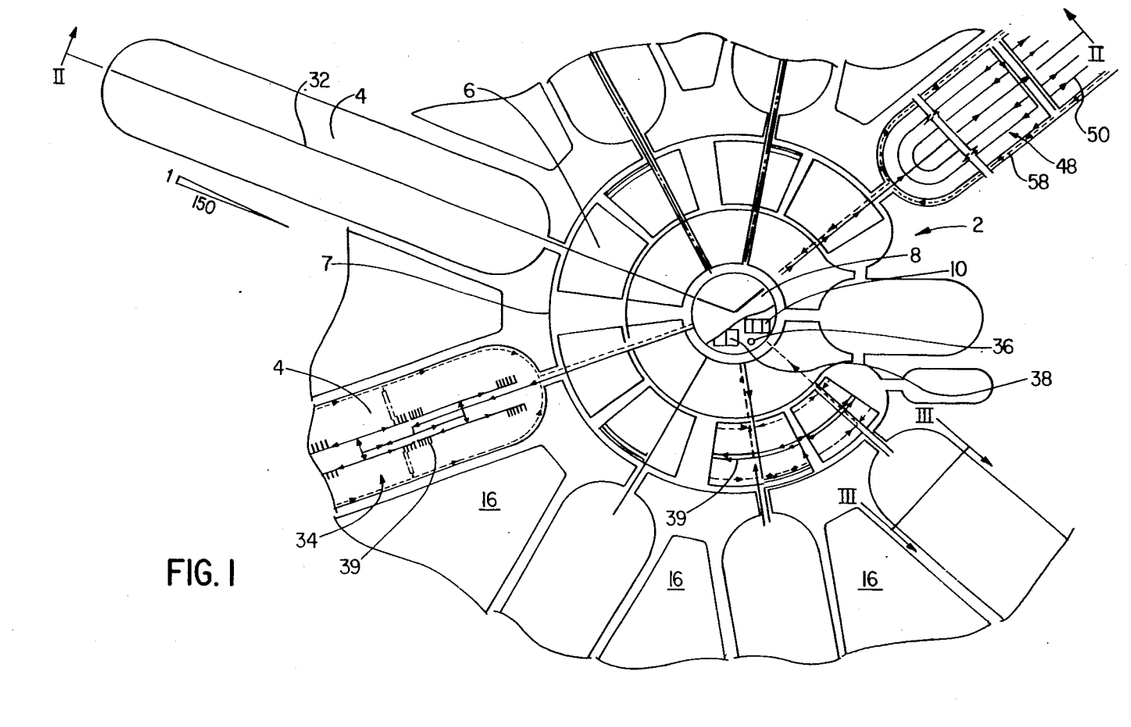
FIG. 1 is a schematic partial plan view of a greenhouse structure in accordance with the present invention.

Turning to FIG. 1 there is illustrated a greenhouse structure 2 in accordance with the present invention, having elongated plant production areas 4 radially extending outwardly from a central plant immature crop development area 6 and a central control area 8. The production areas 4 are interconnected to the immature crop development area 6 but not to each other, as illustrated in FIG. 1. The production and immature crop development areas 4 and 6 are enclosed by an impermeable translucent stressed fabric shell 12 situated on a base 14, the shell and base enclosing a predetermined space (e.g. production areas 4 or immature crop development areas 6). Shell 12 is preferably made of a technically woven polyvinyl chloride coated polyester scrim, with about a 95% light translucency. Such a fabric is highly effective in providing natural light inside the structure. The fabric is preferably lightweight (e.g. 18 ounces per square yard) and flame resistant as well as resistant to oil, chemicals, greases, rot, mildew and certain types of bacteria which attack polyvinyl chlorides and which are prevalent in a moist environment. It is preferably held between arched rib members 15 which rest on the base, the rib members being spread to tension the fabric, for example as described in my U.S. Pat. No. 4,137,687 issued Feb. 6, 1979.

Figure 2:
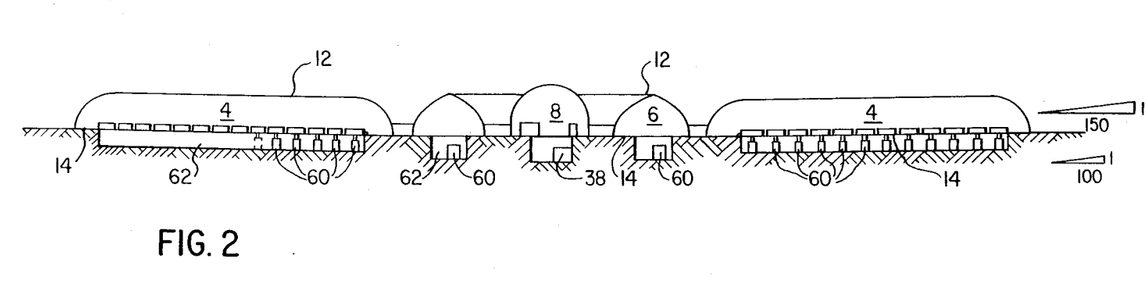
FIG. 2 is a schematic section side view of the structure of FIG. 1 along line II—II.

As can be seen in FIGS. 1 and 2, each of the elongated greenhouse production areas 4 has its base 14 sloped gradually upwardly in the direction away from central supply area 8. A slope 1:150 along the longitudinal center line of the production area has been found to be suitable. This slope permits nutrient feed solution which has been passed to production area 4 to return through pipes, as will be described in more detail hereinafter, by gravity flow to a reservoir 38 in the central supply area 8. The returned nutrient feed solution is thus recovered for reuse. If recovery requirements were only of concern, a much slighter (e.g. 1:500) slope could have been utilized. However, by using a slope of 1:150, the rate of flow by gravity is such that it allows for a smaller reservoir for the nutrient feed solution. Slower flow at smaller slopes will give a greater depth of solution in the return pipes. Since a reservoir must be able contain all the nutrient solution in the system, reducing the amount in the return lines helps to reduce the required size of the reservoir. In addition, the steeper slope gives a quicker turnaround of nutrient solution. This helps to prevent the solution from deaerating. A faster turnaround also assists any temperature control systems for the temperature of the nutrient solution.

Nutrient delivery system 34 (FIG. 1) comprises a pump means 36 which pumps nutrient from reservoir tanks 38 in central supply area 8, to either production areas 4 or immature crop development areas 6, through an appropriate system of piping 39. (While illustrated only schematically for two areas in FIG. 1, it will be understood that similar pipinq systems 39 are in place for the other production areas 4 and immature crop development areas 6).

Figure 3:
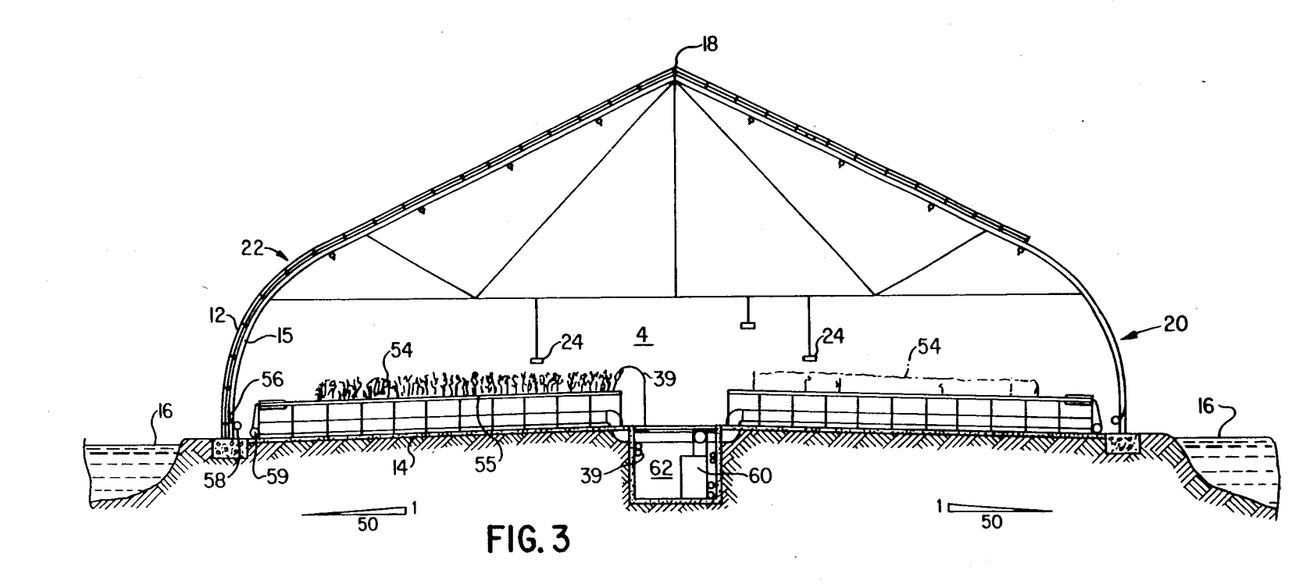
FIG. 3 is a cross-sectional view along line III—III of FIG. 2 through a shell and base of one of the plant production areas of the structure of FIG. 1.

As well, as can be seen in FIG. 3, each of the production areas 4 has a base which is sloped downwardly, away from the centre in the transverse direction. This slope may be, for example 1:50, and serves to ensure a proper flow of nutrient and ready collection of excess nutrient for return to central supply area 8.

The radial layout of elongated plant production areas 4, as illustrated in FIG. 1, assists in achieving maximum natural lighting of these production areas by limiting the shading of one production area 4 by another. In addition as can be seen FIG. 3, the delivery of light to the interior of the structure is further enhanced by the fact that there are very few pipes, waterlines or other physical obstructions allowed above the plant growing area. Also, as illustrated in FIG. 3, base 14 for production area 4 is elevated with respect to, and preferably surrounded by, reflective surfaces 16. These may be a light coloured surface e.g. of reflective plastic, or, water ponds as illustrated. ice surfaces (in below-freezing temperatures) or the like. In this manner, even when there is a low solar angle, light is transmitted by reflection, as well as directly, into the structure through shell 12 As can be seen in FIG. 3, the sides which make up shell 12 extend upward, from base 14, in convex fashion and meet at crest 18, forming two sides 20 and 22 for the shells of each of the elongated production areas 4.

The shells 12 extend over corresponding bases 14 of each of the areas illustrated in FIG. 1 to seal the environment within such areas against external environmental air conditions. This is important since it makes possible the close control of environmental conditions within each of the areas of the structure, such as humidity and carbon dioxide concentration. Otherwise, this would not be possible.

Microprocessor 10 (FIG. 1) is electronically associated with nutrient monitoring means (not shown) in tanks 38, and at all times monitors and controls the concentration of nutrient feed solution in tanks 38.

Figure 4:
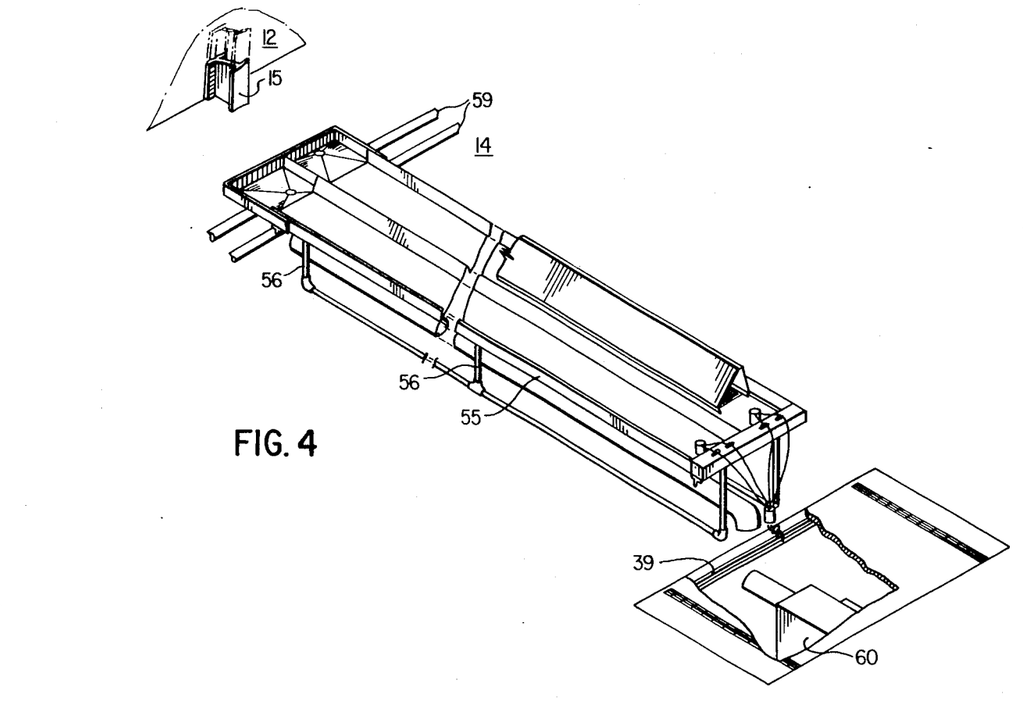
FIG. 4 is a partial perspective view of a portion of a nutrient delivery system for the structure in accordance with the present invention.

As can be seen in FIG. 4, nutrient delivered through conduits 39 is passed to trays 55 in which sit the roots of plants to be grown (in production areas 4) or inert blocks of seeds or seedlings (immature crop development areas 6). Excess nutrient not required by the plants, seeds or seedlings is collected and returned to nutrient tanks 38. Thus it is preferred to slope base 14, particularly in each production area 4 downwardly from the centre transversely towards the sides and downwardly from the outer ends to the inner ends to facilitate collection of excess nutrient and water from these areas.

The downward slope coming away from the center line of the production area 4, as illustrated in FIG. 3, allows for excellent speed of flow of nutrient feed solution through each of the canals and trays 55 (FIG. 4). This prevents oxygen and nutrient depletion from becoming a problem along the length of the canals. In addition, by maintaining such a relatively steep slope, the depth of solution in the canal is also kept low. A shallow film of solution is ideal for the roots of plant 54 in trays 55. This fact also reduces the required size of the reservoir tanks 38 required to hold all the solution when it drains back as the canals in trays 55 themselves contain the largest portion of the solution in the system. Additionally, since trays 55 are adjustable on base supports 56, with the high slope already built into the system as indicated, the additional slope which may be achieved by adjustment of base 56 of trays 55 becomes much more significant. As well, all of the nutrient solution which passes from trays 55 is recollected on a continuous basis through pipes 59 (FIG. 4). These pipes are sloped towards central supply area 8 to cause this excess nutrient solution to flow back to reservoir 38 on a gravity basis, without requiring the use of a pumping system.

Because of the computerized control of the nutrient concentration being delivered to production areas 4 and immature crop development areas 6, the nutrient concentration may be adjusted to suit the particular plants being grown and the stage of growth of these plants. Microprocessor 10 may be appropriately programmed to modify the nutrient composition and concentration for the plants over the life of the plants, to ensure proper nutrient composition and concentration for each stage of plant growth, and hence optimium plant growth.

Figure 5:
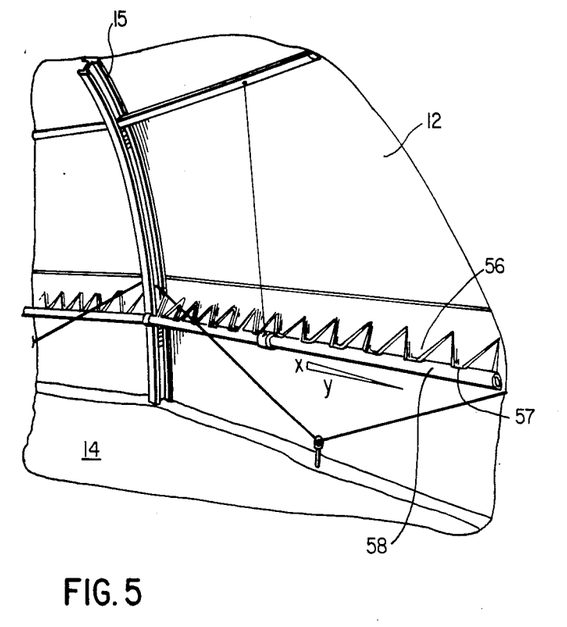
FIG. 5 is a partial perspective view of the interior of one of the shells of the structure.

Additionally, as can be seen in FIG. 5, the interior walls of shell 12 are preferably with means for collecting Water vapor Which condenses on the interior surfaces, including water vapor from transpiration of the plants. This water travels down the sides of the shell and is collected by means of collection skirts 56 passing into slots 57 in collection pipes 58, collection pipes 58 returning this condensed water to central supply area 8 where it is used as required by being mixed with nutrient in tanks 38. pipes 58 pass beside the lower portions of the sides of shell 12 in production areas 4, and are sloped to again feed collected water by gravity flow back to central supply area 8.

Finally, as can be seen in FIGS. 2 and 3, a basement corridor 62 is provided below the floor of base 14, in which sit furnaces 60 to provide as required the appropriate heating for areas 4 and 6 above them. As well, in these corridors 62 which run centrally longitudinally below the bases 14 of each of the longitudinal production areas 4, nutrient delivery conduits 39 are located as illustrated. By using these corridors 62 for passage of the pipes 39 from the reservoir 38 in central service area 8, piping 39 in the nutrient supply system continously rises in elevation until delivery of nutrient to trays 55 takes place. This aspect of the present invention ensures that the slope on the nutrient feed pipes 39 can be maintained and then any leakage or break in a supply pipe is quickly detected and repaired. Thus long time risk to the structure from loss of nutrient supply are prevented. Buried pipes would be much more difficult for location of leaks and would take much longer to repair.

The floors of corridors 62 also rise in elevation with a gradual slope (approximately 1:100) away from the central services area 8. This facilitates collection of water and nutrient leakage in corridor 62.

The transverse lateral slope of the base 14 of each of the production areas 4 allows for any moisture which collects on the surface of base 14 to drain to the external walls formed by shell 12. This serves a dual purpose: from a hygenic point of view it prevents the development of standing water where algae or bacterial or other diseases can grow within the production areas, and it allows for the continuous removal of any internally generated water (e.g. from transpiration) from the zone.

Similarly the 1:150 slope of base 14 longitudinally towards the central services area in production areas 4 is utilized in this fashion. Any liquid, whether it is in solution or water on the floor, will flow along with length of the building by gravity towards central services area 8.

It will be understood that if a problem develops in the nutrient supply system, the structure according to the invention permits an effective and simple means of discharging the reservoir either for normal replenishment or for disease considerations, or for complete collection of solution and water in the system if the system is shut down.

Thus, the present invention provides for easy maintenance increased hygiene (through drainage of an non-processed water from the production zone on a continuous basis) and increased security (through collection of any nutrient solution or water in the system if required and quick detection and repair of any leaks).

While the invention has been described in particular detail with respect to the production areas 4, a similar sloping of the base 14 of immature crop development areas 6, downwardly towards supply area 8 is also preferred, for similar reasons.

Thus there has been provided in accordance with the invention an improved greenhouse structure that fully satisfies the objects, aims and advantages set forth above. While the invention has been described in conjunction with a specific embodiment thereof it is evident that many alternatives modifications and variations will be apparent to those skilled in the art in light of the foregoing description. Accordingly, it is intended to embrace all such alternatives, modifications and variations as fall within the spirit and broad scope of the invention.

What I claim as my invention:

1. In a greenhouse structure for growing plants using nutrient feed solution, the improvement characterized by a plurality of elongated greenhouse production areas, each having a shell and a base enclosing a predetermined space within which plants are to be grown and radially extending outwardly from a central supply area in which nutrient feed solution to be supplied to the production areas is to be kept, the base of each of the production areas being loped downwardly away from the center in the transverse direction and sloped upwardly in the direction away from the central supply area so that excess nutrient feed solution passed to the production areas will return by gravity flow to the central supply area, pump and conduit means to supply nutrient feed solution from the central supply area to the production areas and conduit means sloped to return by gravity flow excess nutrient from the production areas to the central supply area.

2. A greenhouse structure according to claim 1 wherein the slope of each production area base is approximately 1:150 along the longitudinal central line of the production area.

3. A structure according to claim 2 wherein each of the production area bases is sloped downwardly away from the centre in the transverse direction at a slope of approximately 1:50.

4. A structure according to claim 1 wherein the slope of each of the production area bases is approximately 1:50 downwardly away from the centre.

5. A structure according to claim 1 wherein an elongated corridor extends beneath the base of each production area, and the conduit means to supply nutrient feed solution to each production area passes through the corresponding corridor below that production area.

6. A structure according to claim 1 wherein the conduit means for carrying nutrient feed solution from the central supply area to the production area continuously rise in elevation away from the central supply area.

7. A structure according to claim 1 wherein conduit means carrying nutrient feed solution from the central services area to the production area continuously rise in elevation.

8. In a greenhouse structure for growing plants using nutrient feed solution, the improvement characterized by a plurality of elongated greenhouse production areas, each having a shell and a base enclosing a predetermined space within which plants are to be grown and radially extending outwardly from a central supply area in which nutrient feed solution to be supplied to the production areas is to be kept;

the base of each of the production areas being sloped upwardly in the direction away from the central supply area so that excess nutrient feed solution passed to the production areas will return by gravity flow to the central supply area, pump and conduit means to supply nutrient feed solution from the central supply area to the production areas and conduit means sloped to return by gravity flow excess nutrient from the production areas to the central supply area;

each shell being of impermeable material and having convex sides extending upwardly to a central peak extending longitudinally over the production area, the sides of the shell having sufficient incline to permit water condensing on the internal surfaces thereof to pass down the walls, and wherein means are provided along the bottoms of the shells to collect condensed water and conduit means are provided to carry the collected condensed water from the collection means to the central supply area to be mixed with nutrient to form the nutrient feed solution.

9. A structure according to claim 8 wherein the conduit means are sloped to provide gravity flow of the collected condensed water to the central supply area.

10. A structure according to claim 9 wherein each of the production area bases is sloped downwardly away from the centre in the transverse direction at a slope of approximately 1:50.

11. A structure according to claim 8 provided with a nutrient solution supply means for the roots of plants, the nutrient solution supply means comprising a plant root nutrient monitor means and a plant root nutrient control means for plants grown within the space, microprocessor means electronically associated with the plant root nutrient monitor and control means and programmed to provide optimum nutrient concentration conditions for nutrient solution being fed to the roots of the plants being cultivated in the space, the nutrient control means comprising a nutrient solution mixing tank, means associated with the microprocessor to monitor the concentration of nutrient in solution in the tank, a nutrient source activated by the microprocessor controls means to feed required nutrient into the tank and conduits to supply nutrient solution from the tank to the roots of the plants being cultivated, the conduit means carrying water collected in the collection means of the shells to the nutrient solution mixing tank as required with nutrient solution.

* * * * *

UNITED STATES PATENT AND TRADEMARK OFFICE
CERTIFICATE OF CORRECTION

PATENT NO. : 4,800,674

DATED : January 31, 1989

INVENTOR(S) : Phililp D. Sprung

It is certified that error appears in the above-identified patent and that said Letters Patent is hereby corrected as shown below:

```
Column 2, line 52 change "pump" to -Pump-
Column 3, line 32 change "ma" to -may-
Column 5, line 24 change "back as" to -back, as-
Column 5, line 48 change "Water" to -water-
Column 5, line 48 change "Which" to -which-
Column 5, line 55 change "pipes" to -Pipes-
Column 6, line 37 change "an" to -any-
Column 6, line 52 change "alternatives modifications" to
     -alternatives, modifications-
Column 6, line 67 change "loped" to -sloped-
```

Signed and Sealed this

Twenty-sixth Day of September, 1989

Attest:

DONALD J. QUIGG

Attesting Officer

Commissioner of Patents and Trademarks